No. 868,671. PATENTED OCT. 22, 1907.
G. KUKOVAC.
BICYCLE BRAKE.
APPLICATION FILED MAY 22, 1907.
2 SHEETS—SHEET 2.
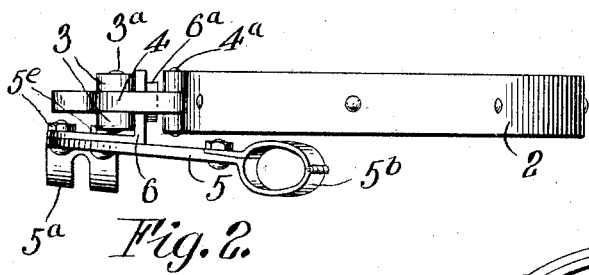
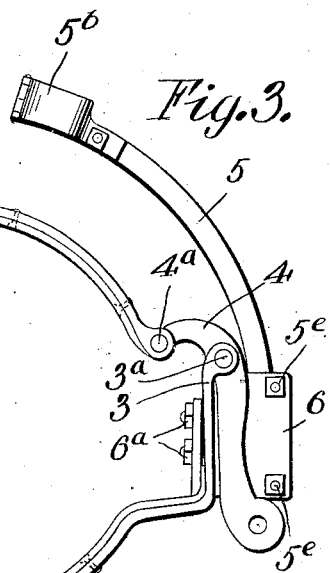
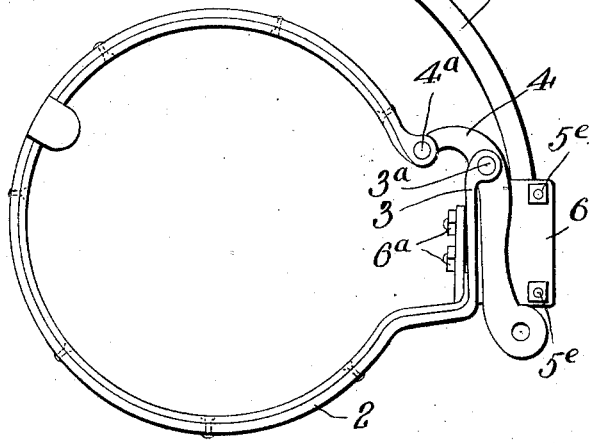
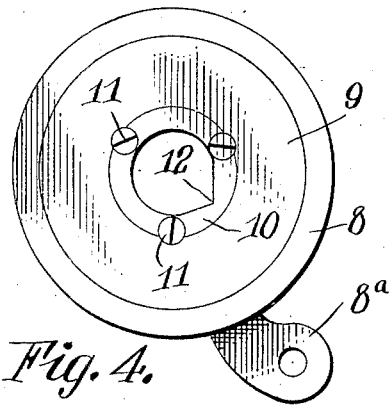
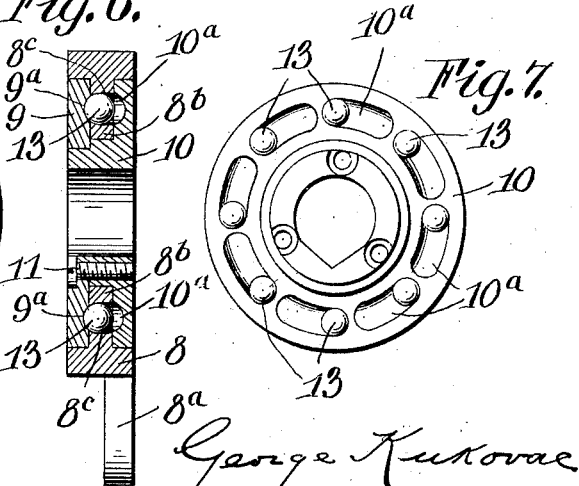
WITNESSES:
C. E. Smith.
G. E. Tew.
George Kukovac.
INVENTOR
BY Milo B. Stevens & Co.
Attorneys

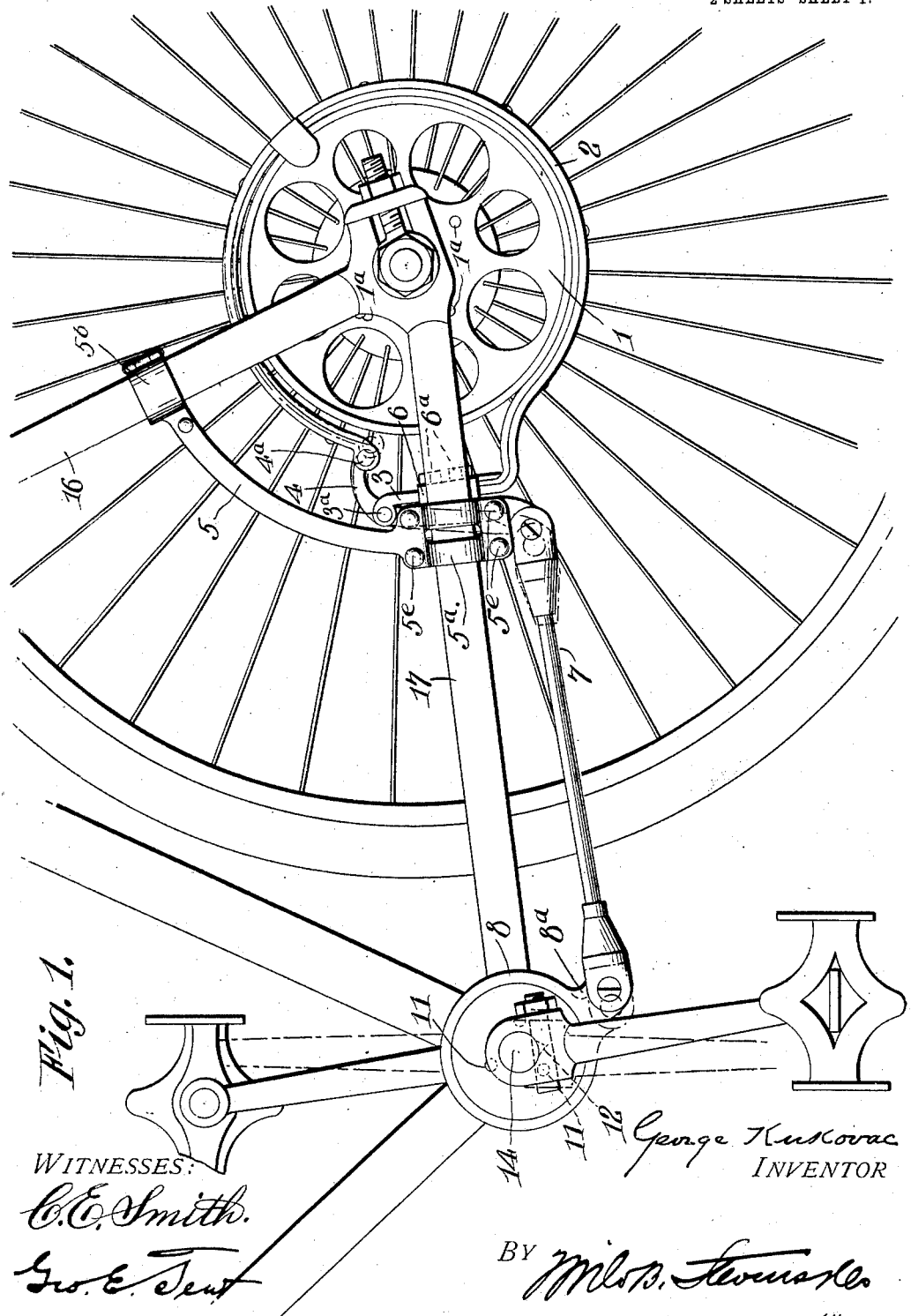

UNITED STATES PATENT OFFICE.

GEORGE KUKOVAC, OF CHICAGO, ILLINOIS.

BICYCLE-BRAKE.

No. 868,671.  Specification of Letters Patent.  Patented Oct. 22, 1907.

Application filed May 22, 1907. Serial No. 375,149.

*To all whom it may concern:*

Be it known that I, GEORGE KUKOVAC, a subject of the Emperor of Austria, residing at Chicago, in the county of Cook and State of Illinois, have invented certain new and useful Improvements in Bicycle-Brakes, of which the following is a specification.

This invention is a band brake for bicycles, of that class in which the brake is operated by back pedaling.

It includes a band brake at the rear wheel, and a clutch at the crank, the clutch being connected to the band so that when the pedals are backed the brake is put on.

The invention is characterized by novelties and improvements of construction, resulting in an effective and quick acting brake for the purpose intended.

The invention is illustrated in the accompanying drawings, in which

Figure 1 is a side elevation of the same applied to a bicycle. Fig. 2 is a top view of the brake band and associated parts removed from the wheel. Fig. 3 is a side elevation of the parts shown in Fig. 2. Fig. 4 is a side view of the clutch. Fig. 5 is a side view of one of the clutch members. Fig. 6 is a cross section of the clutch. Fig. 7 is an inner side view of one of the other clutch members.

Referring specifically to the drawings, 1 indicates the brake drum fixed on the rear wheel of the bicycle by bolts indicated at $1^a$. Extending around this drum is a steel band 2 which may be provided with the usual leather lining. One end of this band terminates in a vertical head or portion 3 with ears between which a bent lever 4 is fulcrumed by a screw $3^a$. The lever 4 is connected to the other end of the band by a screw $4^a$.

The band is supported in position or in proper relation with respect to the drum by means of a curved arm 5 which extends across the angle between the upper and lower rear forks 16 and 17 of the frame of the bicycle, to which forks the arm is fastened by clamps at the end indicated at $5^a$ and $5^b$, respectively. An angular block 6 is secured to the arm 5 by bolts $5^c$, and the head or end 3 of the band is fixed to the angular piece or block by bolts $6^a$, holding said band in line with the drum.

The bent lever 4 is connected at its upper end to the free end of the band and extends down within or beside the lower fork 17, and is connected by a rod 7 to an arm $8^a$ projecting from a ring 8 which forms part of the clutch. This ring extends around the crank axle and is provided with the internal circumferential flange $8^b$ which has a series of grooves $8^c$ arranged in a circumferential line around the same and extending at an angle to the plane of the flange or ring. Said flange fits between outer rings or disks 9 and 10, the latter of which is provided with a hub over which the rings 8 and 9 fit, and said hub fits over or upon the crank shaft 14, and has a notch 12 to receive a key on the crank shaft, whereby rotation of the rings 9 and 10 is prevented, said rings being connected together by screws 11. The inner faces of the disks 9 and 10 are grooved as at $9^a$ and $10^a$ to correspond with the inclined grooves $8^c$ in the member 8. Balls 13 are located and held within the grooves.

In one direction, the movement of the disks 9 and 10 relative to the ring 8 carries the balls 13 to the large end of the grooves $8^c$, in which they run free, and do not clutch the parts. On reverse movement incident to back pedaling, the balls run up the incline of the groove and jam against the disk 10 thereby clutching the members together and causing the ring 8 to turn in proper direction to apply the brake, by means of the connecting rods 7 and the lever 4, such position being indicated in dotted lines in Fig. 1. This brings the machine to an almost immediate stop. The forward turn of the pedals instantly releases the clutch and throws off the brake.

I claim:

In a bicycle brake, the combination of a brake drum fixed to the wheel of the bicycle, an arm 5 clamped at its opposite ends to the rear forks of the frame, an angular block 6 one flange of which is fixed to the arm, a band extending around the drum, one end thereof being fixed to the other flange of the block, a lever fulcrumed on the block and connected to the other end of the band, and means to operate the lever.

In testimony whereof I affix my signature, in presence of two witnesses.

GEORGE KUKOVAC.

Witnesses:
H. G. BATCHELOR,
JOHN M. STOMIC.